United States Patent [19]

Straub

[11] Patent Number: 5,688,067

[45] Date of Patent: Nov. 18, 1997

[54] COUPLER ASSEMBLY FOR AXIALLY CONNECTING TWO SHAFTS

[75] Inventor: Peter H. Straub, Leduc, Canada

[73] Assignee: Camco International Inc., Houston, Tex.

[21] Appl. No.: 532,959

[22] Filed: Sep. 22, 1995

[51] Int. Cl.[6] .................................................. F16B 7/18
[52] U.S. Cl. ........................... 403/305; 403/300; 403/359
[58] Field of Search .................................. 403/298, 299, 403/307, 305, 300, 359, 306, 301

[56] References Cited

U.S. PATENT DOCUMENTS

| 502,686 | 8/1893 | Tilton | 403/300 |
|---|---|---|---|
| 1,469,304 | 10/1923 | Hughes | 403/305 |
| 2,339,488 | 1/1944 | Kratoville | 403/305 |
| 2,574,648 | 11/1951 | Mason | 403/305 X |
| 2,678,226 | 5/1954 | Wright | 403/299 X |
| 3,588,154 | 6/1971 | Voight et al. | 403/359 X |
| 4,081,219 | 3/1978 | Dykmans | 403/301 X |

FOREIGN PATENT DOCUMENTS

| 5179762 | 7/1993 | Japan | 403/299 |

Primary Examiner—Harry C. Kim

[57] ABSTRACT

A coupler assembly for connecting first and second shafts in axial alignment comprises a first and second stop members attached to the shafts adjacent their respective ends; a cylindrical body; anti-rotation devices on the cylindrical body for preventing the first shaft from rotating with respect to the second shaft; first and second caps; and threads on the inside of the caps cooperative with threads on the cylindrical body for drawing the first and second shafts together. The coupler assembly is adjustable to compensate for differences in axial positioning of the shafts, such as due to bearing wear in a drive train, but upon installation prevents axial displacement of the shafts, as well as prevents relative rotation of the shafts.

4 Claims, 2 Drawing Sheets

COUPLER ASSEMBLY FOR AXIALLY CONNECTING TWO SHAFTS

BACKGROUND OF THE INVENTION

1. Field of the Invention

The present invention relates to a coupler assembly for axially connecting two shafts and, more particularly, to a coupler assembly that is used within downhole equipment.

2. Description of Related Art

Subterranean fluids, such as oil, gas and water, are often pumped or "lifted" from wellbores by the operation of downhole pumps, such as by electric submergible pumping systems (ESP's). ESP's typically use an elongated electric motor installed within the wellbore to rotate a multi staged centrifugal pump. Under most circumstances the couplers used to axially connect the drive shaft of the motor to the pump's rotor shaft permit limited axial movement therebetween to allow for thermal expansion and contraction of the shafts. However, under certain circumstances, there is a need for a coupler that can axially connect the shafts in a manner that does not permit relative axial movement. This is essentially true with surface installations of pumping units, such as the HPS pumping unit marketed by Reda Pump Division of Camco International Inc. Also, this is true in wellbore installations of SPSs where the pump is installed below the motor in an upside down arrangement.

While numerous couplers could be used to axially connect the shafts in the above described desired manner, a problem with such couplers is encountered in the installation of the equipment. Specifically, while the completed installation of the coupler to the shafts will not permit relative axial movement, there is a need for some axial movement during the installation of the coupler to the shafts to adjust for various operating dimensions and/or positioning of components.

There is a need for a coupler assembly for use in pumping equipment that will connect two shafts in axial alignment, provide for limited axial movement adjustment during installation, and thereafter prevent relative axial movement of the shafts.

SUMMARY OF THE INVENTION

The present invention has been contemplated to overcome the foregoing deficiencies and meet the above described needs. Specifically, the present invention is a coupler assembly for connecting first and second shafts in axial alignment. The coupler assembly comprises first and second stop members attached to the shafts adjacent their respective ends, a cylindrical body, and anti-rotation devices in the cylindrical body for preventing the first shaft from rotating with respect to the second shaft. First and second cylinder caps with threads on the inside thereof cooperate with threads on an outer surface of the cylindrical body for drawing the first shaft towards the second shaft. The coupler assembly is adjustable to compensate for differences in axial positioning of the shafts, such as due to bearing wear in a drive train, but upon installation prevents axial displacement of the shafts, as well as prevents relative rotation of the shafts.

DETAILED DESCRIPTION OF THE PREFERRED EMBODIMENTS

As described briefly above, the present invention is a coupler assembly for connecting first and second shafts in axial alignment. The coupler assembly is adjustable to compensate for differences in axial positioning of the shafts, such as due to bearing wear, but upon installation prevents axial displacement of the shafts, as well as relative axial rotation of the shafts.

Figure 1:
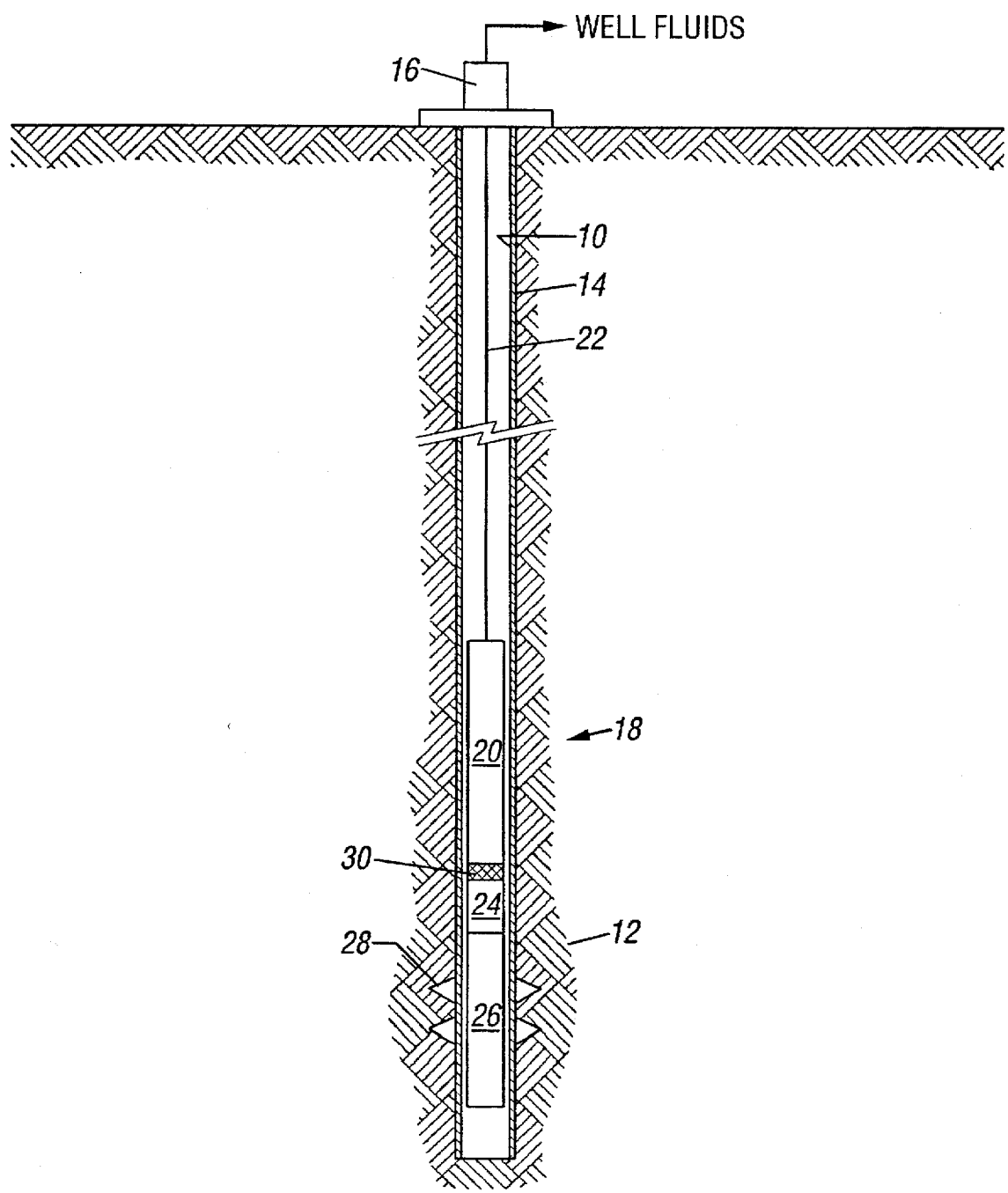
FIG. 1 is a side elevational view of an electric submergible pumping system including a coupler assembly of the present invention.

To aid in the understanding of the present invention, reference is made to the accompanying drawings. FIG. 1 illustrates a well 10 adapted to recover subterranean fluids, such as oil, gas and/or water, from one or more subterranean earthen formations 12. The well 10 includes a tubing or casing string 14 which is connected at the earth's surface to a production tree 16, which includes appropriate valving and piping, as is well known to those skilled in the art. Suspended within the well 10 is an electric submergible pumping system (ESP), generally indicated by reference number 18. The ESP 18, for the purposes of the present discussion, comprises a multi staged centrifugal pump 20 connected at an upper portion thereof to a production tubing 22 for the transport of the subterranean fluids to the earth's surface. Connected to a lower end of the pump 20 is an ESP's electric motor protector 24 and connected below the motor protector 24 is an ESP's electric motor 26. As is well known to those skilled in the art, fluids from the subterranean formations 12 enter through openings or perforations 28 in the casing 14, and the fluids are transported upwardly past the exterior of the electric motor 26 and the motor protector 24 to enter one or more openings 30 in a lower portion of the pump 20. Once the fluids enter the opening(s) 30, the fluids are transported upwardly through the pump 20 by the rotation of the rotors (not shown) through the piping 22 to the earth's surface.

As has been described above, the coupler assembly of the present invention is intended for use as an interconnection between a rotor of the pump 20 and a drive shaft either of the motor protector 24 or of the electric motor 26. However, it should be understood that the coupler assembly of the present invention can also be used to interconnect any two rotatable shafts, such as in a drive train of a vehicle, vessel, railroad engine, construction equipment, industrial drive trains, air compressors, milling machinery, and the like.

Figure 2:
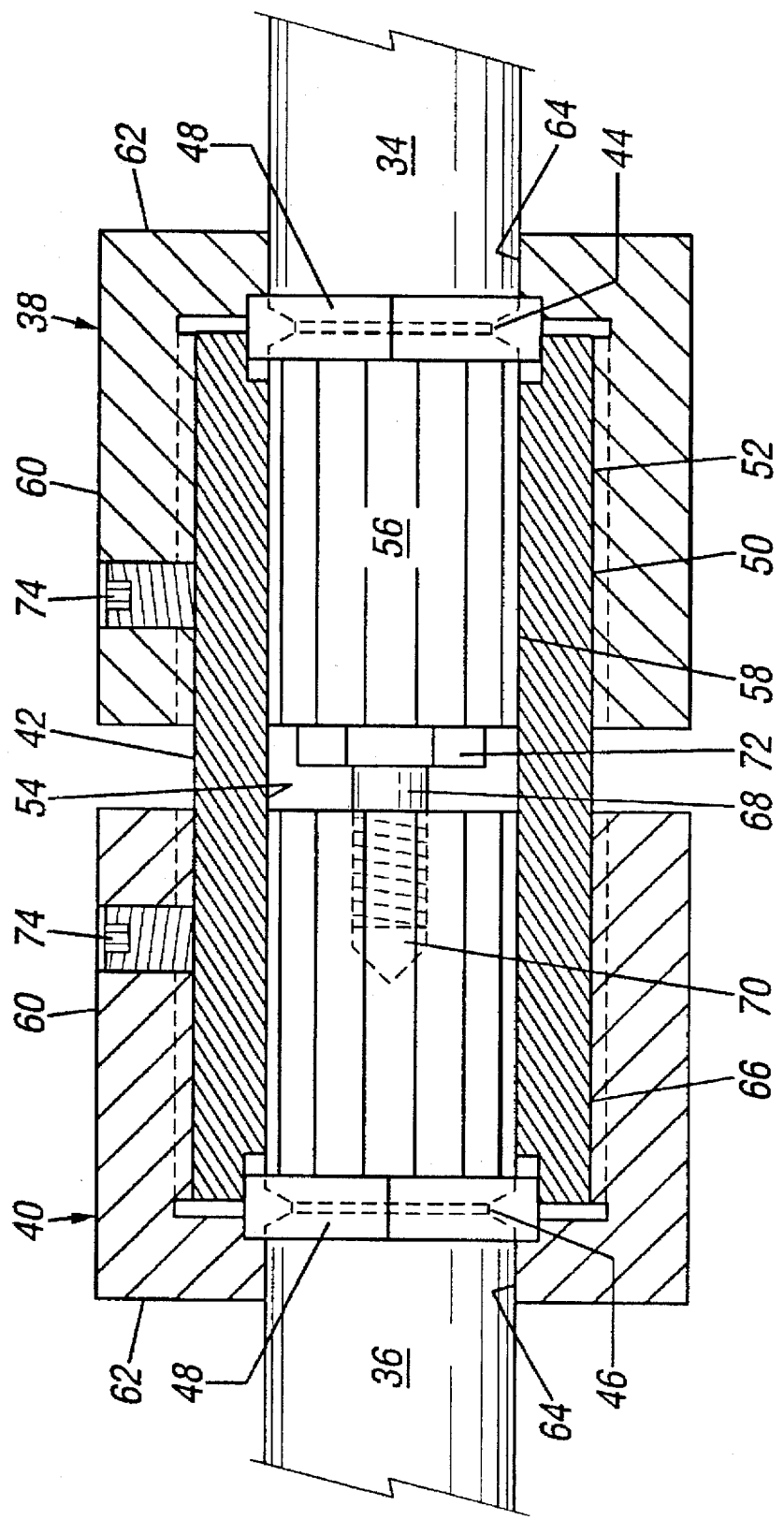
FIG. 2 is a side elevational sectioned view of one preferred embodiment of a coupler assembly of the present invention.

As shown in FIG. 2, one preferred embodiment of a coupler assembly 32 of the present invention is used to axially interconnect a first shaft 34 with a second shaft 36. For the purposes of this discussion it will be assumed that the first shaft 34 extends from either an ESP's motor protector or an ESP's electric motor (not shown), and the second shaft 36 extends from a centrifugal pump (not shown). The coupler assembly 32 generally comprises a first cylinder cap 38 and a second cylinder cap 40, both of which are removably connected to a cylinder body 42, as will be described in detail below.

An annular notch 44 is provided in the first shaft 34 adjacent an end thereof, and an annular notch 46 is provided in the second shaft 36 adjacent an end thereof. One or more rings 48, such as snap rings, are fitted around the shafts 34 and 36 and are partially recessed into the notches 44 and 46 so that an outside diameter of the rings 48 is greater than an outside diameter of the shaft 34 or 36 to which the ring 48 is attached. In place of snap rings, the rings 48 can be rings that are either permanently affixed to the shafts or are set between upstarts or swages in the shafts 34 and/or 36.

The cylindrical body 42 has an outer surface 50 with a plurality of threads 52 thereon, and an axial bore 54 therethrough of a single or multi diameter sufficient to have the ends of the shafts 34 and 36 received at least partially thereinto. It is preferred that the internal diameter of the bore 54 be as close as possible to the outer diameter of the shafts 34 and 36 to provide a snug fit and limit any bending movement. The cylindrical body 42 is provided with devices to prevent the relative rotation of the first and second shafts 34 and 36. These devices can comprise one or more pins that extend laterally through the cylindrical body 42 and partially into the shafts 34 and 36. Preferably, these devices comprise a plurality of axial splines 56 on the ends of the shafts 34 and 36 that fit into a plurality of grooves 58 formed on an internal surface of the cylindrical body 42. Also, axial notches can be formed in the internal surface of the cylindrical body 42 and in the shafts 34 and 36, with one or more key members (not shown) set within these notches to prevent relative axial rotation of the shafts 34 and 36.

The first and second cylinder caps 38 and 40 each comprise a cylindrical section 60 and an end cap section 62, which has a bore 64 extending therethrough and having a diameter greater than an outer diameter of the respective shaft 34 or 36 that passes therethrough. Each cylindrical section 60 includes threads 66 on an internal surface thereof that cooperate with the threads 52 on the outer surface 50 of the cylindrical body 42.

The assembly and use of the present invention is as follows. The first cylindrical cap 38 is placed over the first shaft 34, and likewise the second cylindrical cap 40 is placed over the second shaft 36. The rings 48 are placed onto the shafts 34 and 36, and are fitted into their respective recesses 44 and 46. The shafts 34 and 36 are brought together in general axial alignment and are received into the bore 54 in the cylindrical body 42. The first and second cylinder caps 38 and 40 are rotated to become threadedly attached to the cylindrical body 42 by way of the threads 52. As the caps 38 and 40 are moved towards one another by the pitch of the threads 52 and 66, the end cap sections 62 each contact the rings 48, which act as stop members. Further rotation of the caps 38 and 40 forces each ends of the cylindrical body 42 against the rings 48 and/or an inner surface of the end cap sections 62.

It will be understood by those skilled in the art that as the caps 38 and 40 are drawn closer together the shafts 34 and 36 are brought into and rigidly held in axial alignment. The anti-rotation devices, such as the splines 56 and grooves 58, pins or key members, prevent the shafts 34 and 36 from rotating with respect to one another. Additionally, the distance between the ends of the shafts 34 and 36 can be adjusted in the present invention by either using cylindrical bodies 42 of differing length, or preferably by threading a bolt 68 into a threaded axial bore 70 in an end of the shaft 36. Upon rotation of the bolt 68, a bolt head 72 abuts against the end of the shaft 34 to provide the needed length adjustment, and still prevent axial movement of the shafts 34 and 36.

To ensure that the coupling assembly 32 stays in proper alignment and does not disassemble due to rotational vibrations and torque motions, one or more set screws or pins 74 extend through the caps 38 and 40 and into the cylindrical body 42 or even through the cylindrical body 42 and into the shafts 34 and 36.

The coupler assembly of the present invention, as described above, is adjustable to compensate for differences in axial positioning of the shafts, such as due to bearing wear in a drive train, but upon installation prevents axial displacement of the shafts, as well as prevents relative axial rotation of the shafts.

Whereas the present invention has been described in particular relation to the drawings attached hereto, it should be understood that other and further modifications, apart from those shown or suggested herein, may be made within the scope and spirit of the present invention.

What is claimed is:

1. A coupler assembly comprising:

a first shaft having longitudinal splines along an end portion thereof;

a second shaft having longitudinal splines along an end portion thereof, said second shaft being in axial alignment with said first shaft;

a first stop member attached to said first shaft adjacent the end portion thereof;

a second stop member attached to said second shaft adjacent the end portion thereof;

a cylindrical body having an axial bore therethrough sized to permit the end portions of said first and second shafts to be inserted thereinto, said cylindrical body having an interior surface with longitudinal grooves thereon and an exterior surface with threads thereon, said longitudinal grooves being cooperable with said longitudinal splines on said first and second shafts to prevent relative rotation between said first and second shafts;

a first cap having a cylindrical section and a first end cap, said first end cap having a bore therethrough for receiving thereinto the end portion of said first shaft to a distance where said first end cap contacts said first stop member;

a second cap having a cylindrical section and a second end cap, said second end cap having a bore therethrough for receiving thereinto the end portion of said second shaft to a distance where said second end cap contacts said second stop member;

threads on an interior surface of each of said cylindrical sections of said first and second caps for cooperating with said threads of said cylindrical body for axially drawing said first and second shafts together by rotation of said first and second caps with respect to said cylindrical body; and an adjustable spacer means being attached to and longitudinally extending from the end portion of said first shaft, said spacer means abutting an end face of said second shaft to permit said first and second shafts to be rigidly connected together while preventing an end face of said first shaft from directly contacting said end face of said second shaft.

2. The coupler assembly of claim 1, wherein each of said first and second stop members comprises an annular ring which attaches onto an annular notch formed on the respective one of said first and second shafts.

3. The coupler assembly of claim 2, wherein said each annular ring has an outside diameter greater than an outside diameter of the respective shaft to which said ring is attached.

4. The coupler assembly of claim 1, wherein said spacer means comprises a bolt with a head portion that abuts against the end face of said second shaft and a threaded shank that is threadedly received into a bore longitudinally extending into the end portion of said first shaft.

\* \* \* \* \*